May 1, 1934.  A. H. NEUREUTHER  1,957,281

SYNCHRONOUS MOTOR

Filed April 20, 1933    2 Sheets-Sheet 1

INVENTOR

May 1, 1934.　　　A. H. NEUREUTHER　　　1,957,281
SYNCHRONOUS MOTOR
Filed April 20, 1933　　　2 Sheets-Sheet 2

INVENTOR
Andrew H Neureuther

Patented May 1, 1934

1,957,281

UNITED STATES PATENT OFFICE 1,957,281

SYNCHRONOUS MOTOR

Andrew H. Neureuther, Peru, Ill., assignor to Western Clock Company, Peru, Ill., a corporation of Illinois Application April 20, 1933, Serial No. 667,002

14 Claims. (Cl. 172—275)

My invention relates to synchronous motors and has for its object the production of a small synchronous motor driven by the alternating current from commercial lighting and power systems that can be used to drive clock hands or other time indicating means especially when said commercial systems are operated at a regulated frequency of 60 cycles per second, or some other standard frequency.

A further object of my invention is to produce an extremely simple and inexpensive motor that will immediately come into step with the alternations of the magnetic field when launched at either above or below approximately synchronous speed manually or automatically by any of the usual means and which will remain in step as long as the current flows regardless of the usual electrical load and surge disturbances on such commercial lighting and power lines. And it is readily started and held in synchronism without the usual mechanical movement or inertia means generally employed previous to my invention.

More specifically a further object of my invention is to produce an extremely simple and inexpensive motor that utilizes the salient and operative features of the polar projections on either one or both the stator and the rotor, wherein a substantial part of the said polar projections on the stator laminations or on the rotor disc remain within the plane of the lamination on the stator or within the plane of the disc on the rotor, while the remaining part of the polar projection is partly separated from the body of the lamination on the stator, or the body of the disc on the rotor and bent at an angle to the plane of the body of the lamination or of the rotor disc. By keeping a part of the polar projection in the plane of the lamination or in the plane of the rotor disc I maintain the maximum torque at synchronous speed and by having the remaining part of the projection bent at an angle to the plane of the lamination of the stator or at an angle to the plane of the rotor disc I retain the maximum starting qualities. It is evident, that both the stator and the rotor can have the aforesaid polar projections in the same motor, or the stator alone can have the aforesaid polar projections on the field poles or on a single field pole while the rotor has the well known usual plain polar projections, or the stator may have the usual well known plain projections while the rotor can have the aforesaid polar projections having a part thereof in the plane of the rotor with the remainder thereof separated therefrom and bent at an angle to the plane of the disc.

If a synchronous motor is made by using both pole pieces of a stator each having a lamination with an arcuate row of the aforesaid polar projections in which each polar projection has a part lying in the plane of the lamination and integral therewith and the remainder thereof separated from the body part of the said lamination and bent at an angle thereto and using a rotor comprising two discs of magnetic material mounted on a shaft fairly close together yet substantially spaced apart, both of said discs having the ordinary polar projections all of which lie within the plane of the body of the disc, but one of the discs having the proper number of such polar projections on its periphery to give the correct synchronous speed for a given alternating current circuit, while the other disc is properly proportioned to have one polar projection less than said correct number of polar projections above mentioned, I have found that it will not only have excellent starting qualities but it will also deliver a larger amount of power. The various combinations will be shown in the drawings described below.

This application is a continuation in part of applicant's former application, Serial No. 605,634 filed April 16, 1932, for Synchronous motors.

I accomplish the above mentioned objects by the means shown in the accompanying drawings in which.

Similar numerals represent the same parts throughout the several views.

Figure 2:
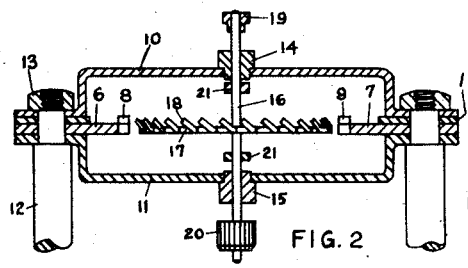
Fig. 2 is a top cross-sectional view along a line 1—1 of Figure 1.

In the drawings 1 represents the frame of the usual clock movement the remainder of which is not shown. Adjacent to this plate 1 and fastened thereto, as shown, are the frames 2 of the motor 3 which have the magnet core 4 fastened across and connecting the lower ends thereof, on which core 4 is mounted the magnet winding 5, as shown, which in operation is connected across the usual commercial alternating current line that has a regulated frequency of 60 cycles per second. The frames 2 and the core 4 are made of magnetic material, the frames 2 having the pole pieces 6 and 7 each of which have a plurality of polar projections or teeth 8 and 9. Said polar projections 8 and 9 are preferably formed into two parts, one part, $a$, thereof, which lies within the plane of the body of the lamination and integral therewith and the remaining part, $b$, thereof, which is separated from the body of the lamination and bent at an angle to the body of the lamination, as clearly shown in Figure 5.

Bearing frames 10 and 11 are fastened to the frames 2 and plate 1 by means of the pillars 12 and the nuts 13 shown, which also serve to hold the remainder of the usual clock movement in position. In these bearing frames 10 and 11 are mounted the bearings 14 and 15 respectively in which is journalled the shaft 16 on which is mounted a rotor 17. The rotor 17 comprises a disc of magnetic material which has a plurality of polar projections or teeth 18 which are formed out of the periphery of the disc and comprise two parts, one part, $a$, thereof, which lies within the plane of the body of the disc and integral therewith and the remaining part, $b$, thereof, which is separated from the body of the disc and bent at an angle to the body of the disc, similarly as previously above described for the stator polar projections and as is clearly shown in Figure 4. Mounted on the shaft 16 is the knurled starting member 19 and on the other end of said shaft 16 is mounted the pinion 20 that drives the usual clock hands, not shown, and also co-acts with the usual manual starting means to start the rotor.

Figure 3:
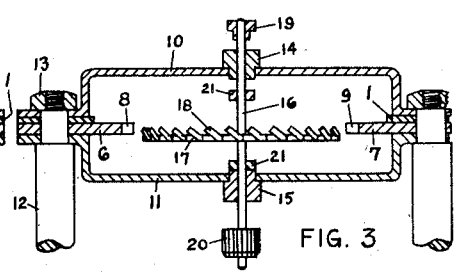
Fig. 3 is a cross-sectional view similar to Figure 2 showing the rotor of my invention held in a different position in relation to the field poles and showing the use of my rotor with polar projections shown in Figure 4 with the usual polar projections on the stator field poles where the entire polar projection lies within the plane of the body of the lamination.

The rotor 17 is kept positioned well within the influence of the magnetic field of the poles 6 and 7 by means of the collars 21 mounted on the shaft 16 adjacent to the bearings 14 and 15 and the rotor may be positioned in the position shown in Figure 2 when the magnet coil 5 is energized by means of the usual alternating current and in the position shown in Figure 3 when the magnet is not thus energized and resilient means may be employed to retain it in said position when said magnet coil 5 is not energized.

Figure 1:
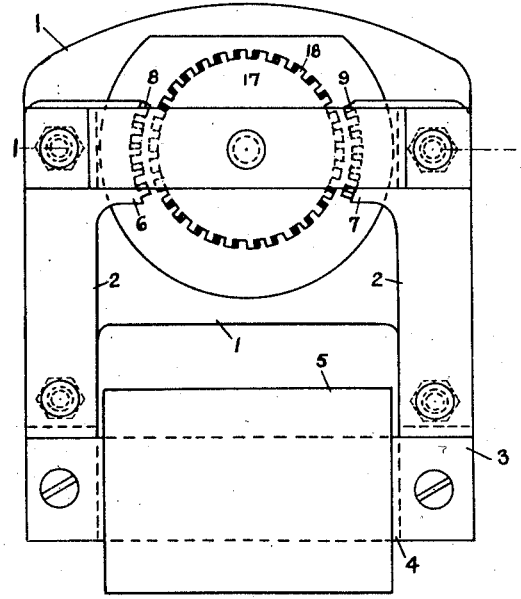
Fig. 1 is a front view of a motor of my invention showing the polar projections above described on both the stator and rotor.
Figure 5:
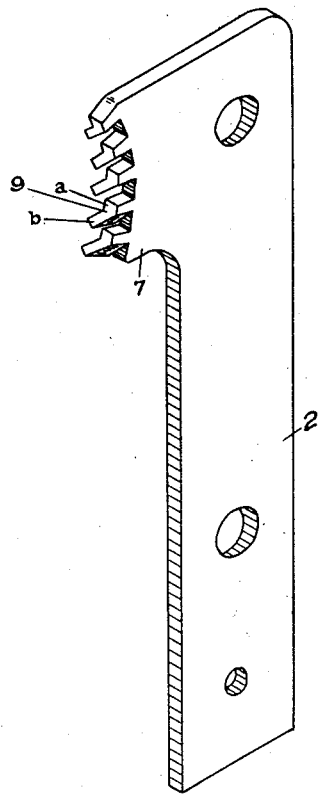
Fig. 5 is an enlarged perspective view of the stator showing the arcuate row of polar projections on the lamination of the pole pieces on the stator field similar to the polar projections on the rotor shown in Figure 4.
Figure 4:
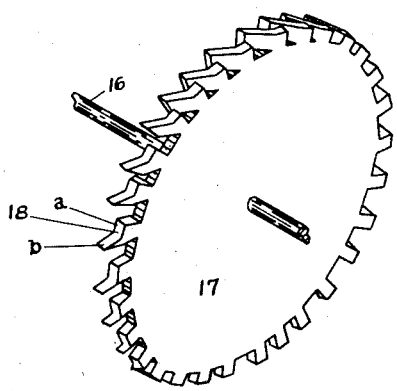
Fig. 4 is an enlarged perspective view of my rotor projections having a part of each of the polar projections lying within the plane of the body of the rotor disc and the remaining part of each disc separated from the body of the disc and bent at an angle to the plane of the body of said rotor disc.
Figure 8:
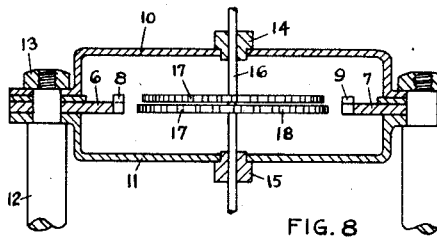
Fig. 8 is a cross-sectional view of Figure 7 similar to that shown in Figure 2.
Figure 6:
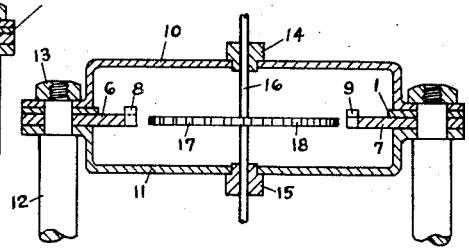
Fig. 6 shows a cross-sectional view of a modification similar to that shown in Figure 2 except that the polar projections on the stator laminations are similar to those shown in Figure 5 and the rotor has the usual polar projections on its periphery all of which polar projections lie within the plane of the disc.
Figure 7:
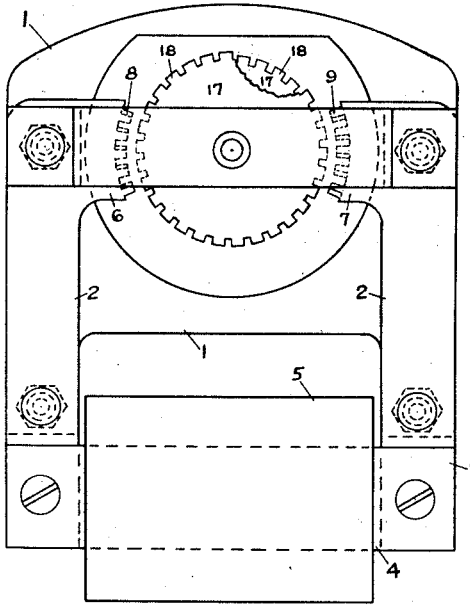
Fig. 7 is a front view similar to that shown in Figure 1 with the stator polar projections shown in Figure 5 but with two rotors each of which has all its polar projections lying in the plane of the body of the disc but one of said rotors having a smaller number (at least one) of polar projections than the other rotor.

In Figures 1 and 2 I have shown both the stator laminations and the rotor disc with polar projections having a part thereof in the plane of the body of the lamination and in the plane of the rotor respectively and the remaining part of the polar projection separated from the body of the lamination and the body of the rotor disc and bent at an angle to the plane of the body of the lamination and the plane of the body of the rotor disc respectively. Figures 4 and 5 are perspective views of the polar projections just above mentioned.

Figures 3, 6, 7 and 8 show various combinations of rotors and stators of my invention, shown in Figures 4 and 5, with the usual stators and rotors as described and shown.

Figure 9:
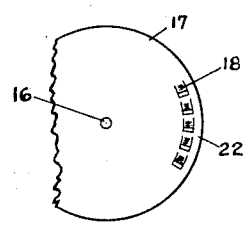
Fig. 9 shows a partial front view of a modification of another rotor.
Figure 10:
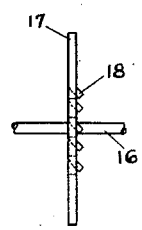
Fig. 10 shows a partial side view of the rotor shown in Figure 9.

Figures 9 and 10 show a modification of my rotor in which the polar projections are formed out of the surface of the disc adjacent to the periphery and having a part of the polar projection angularly disposed to the surface of the disc. This, as shown, leaves more or less a small magnetic parcel or rim 22 leaving the exterior of the rotor complete with varying magnetically saturated parts which tend to stabilize the positioning of the rotor in the magnetic field and tend to keep the torque uniform even if the rotor is not centrally located in the magnetic field. It is evident, if this rotor is placed in a rotating magnetic field it will produce a self-starting synchronous motor.

In operation the usual ends of the coil 5 (which ends are not shown) are connected across the alternating current lighting line. Then the knurled member 19 is taken between the thumb and fingers to spin in the desired direction. Then as above stated the polar projections 18 when the rotor is left spinning as a freely mounted body and approximates synchronous speed will immediately come into step with the alternating magnetic field produced by the alternating current and will remain in synchronism as long as said current flows.

It will be understood, of course, that while I have here shown several forms of my invention, I do not wish to limit myself to the exact constructions shown but desire to have these taken in a sense illustrative of any and all the forms of same as will come fairly within the scope of the appended claims.

I claim:

1. In a synchronous motor, a stator element comprising a lamination of magnetic material having a plurality of arcuate polar projections each of said polar projections comprising a part lying in the plane of the body part of said lamination and integral therewith and a lateral part separated from the body part of said lamination adjacent to the base of said polar projection and angularly disposed to the plane of said body part.

2. In a synchronous motor, a stator element comprising a lamination of magnetic material having a plurality of arcuate polar projections each of said polar projections comprising a part lying in the plane of the body part of said lamination and integral therewith and a lateral part separated from the body part of said lamination adjacent to the base of said polar projection and disposed at an angle of substantially 45 degrees to the plane of said body part.

3. In a synchronous motor, a shaft, a rotor comprising a single disc of magnetic material mounted on said shaft, a plurality of polar projections formed on the periphery of said disc, each of said polar projections comprising a part lying in the plane of the body of said disc and integral therewith and a lateral part separated from the body of said disc adjacent to the base of said polar projection and angularly disposed to the plane of the body thereof.

4. In a synchronous motor, a shaft, a rotor comprising a single disc of magnetic material mounted on said shaft, a plurality of polar projections formed on the periphery of said disc, each of said polar projections comprising a part lying in the plane of the body of said disc and integral therewith and a lateral part separated from the body of said disc adjacent to the base of said polar projection and disposed at an angle of substantially 45 degrees to the plane of the body thereof.

5. In a synchronous motor, stator elements having field poles each comprising a lamination of magnetic material having a plurality of arcuate polar projections each of said projections comprising a part lying in the plane of the body part of said lamination and integral therewith, and a lateral part separated from the said body part of said lamination adjacent to the base of said polar projection and angularly disposed to the plane of said body part, means for exciting said stator elements, a shaft centrally disposed within said field poles, a rotor of magnetic material having a plurality of polar projections on said field poles and manual means for starting said rotor.

6. In a synchronous motor, stator elements each comprising a lamination of magnetic material having a plurality of arcuate polar projections each of said projections comprising a part lying in the plane of the body part of said lamination and integral therewith, and a lateral part separated from the said body part of said lamination adjacent to the base of said polar projection and disposed at an angle of substantially 45 degrees to the plane of said body part, means for exciting said stator elements, a shaft centrally disposed within said field poles, a rotor of magnetic material having a plurality of polar projections mounted on said shaft adjacent to the polar projections on said field poles, and manual means for starting said rotor.

7. In a synchronous motor, stator elements each comprising a lamination of magnetic material having a plurality of arcuate polar projections each of said projections comprising a part lying in the plane of the body part of said lamination and integral therewith, and a lateral part separated from the said body part of said lamination adjacent to the base of said polar projection and angularly disposed to the plane of said body part, means for exciting said stator elements, a shaft centrally disposed within said field poles, a plurality of rotor discs of magnetic material each having a plurality of polar projections mounted on said shaft, one of said rotor discs having a lesser number of polar projections than the other rotor disc and manual means for starting said rotor.

8. In a synchronous motor, stator elements each comprising a lamination of magnetic material having a plurality of arcuate polar projections each of said projections comprising a part lying in the plane of the body part of said lamination and integral therewith, and a lateral part separated from the said body part of said lamination adjacent to the base of said polar projection and disposed at an angle of substantially 45 degrees to the plane of said body part, means for exciting said stator elements, a shaft centrally disposed within said field poles, a plurality of rotor discs of magnetic material each having a plurality of polar projections mounted on said shaft, one of said rotor discs having a lesser number of polar projections than the other rotor disc and manual means for starting said rotor.

9. In a synchronous motor, stator elements each comprising a lamination of magnetic material having a plurality of polar projections, a coil for producing a magnetic field in said stator elements, a shaft mounted within said magnetic field, a rotor comprising a single disc of magnetic material mounted on said shaft, a plurality of polar projections formed on the periphery of said disc, each of said projections comprising a part lying in the plane of the body of said disc and integral therewith and a lateral part separated from the body of said disc adjacent to the base of said polar projection and angularly disposed to the plane of the body thereof and manual means for starting said rotor.

10. In a synchronous motor, stator elements each comprising a lamination of magnetic material having a plurality of polar projections, a coil for producing a magnetic field in said stator elements, a shaft mounted within said magnetic field, a rotor comprising a single disc of magnetic material mounted on said shaft, a plurality of polar projections formed on the periphery of said disc, each of said projections comprising a part lying in the plane of the body of said disc and integral therewith and a lateral part separated from the body of said disc adjacent to the base of said polar projection and disposed at an angle of substantially 45 degrees to the plane of the body thereof and manual means for starting said rotor.

11. In a synchronous motor, stator elements each comprising a lamination of magnetic material having a plurality of arcuate polar projections each of said projections consisting of a part lying in the plane of the body part of said lamination and integral therewith, and a lateral part separated from the said body part of said lamination adjacent to the base of said polar projection and angularly disposed to the plane of said body part, means for exciting said stator elements, a shaft, a rotor mounted on said shaft within said field poles comprising a single disc of magnetic material, a plurality of polar projections formed on the periphery of said disc, each of said polar projections comprising a part lying in the plane of the body of said disc and integral therewith and a lateral part separated from the body of said disc adjacent to the base of said polar projection and angularly disposed to the plane of the body thereof and manual means for starting said rotor.

12. In a synchronous motor, stator elements each comprising a lamination of magnetic material having a plurality of arcuate polar projections each of said projections consisting of a part lying in the plane of the body part of said lamination and integral therewith, and a lateral part separated from the said body part of said lamination adjacent to the base of said polar projection and disposed at an angle of substantially 45 degrees to the plane of said body part, means for exciting said stator elements, a shaft, a rotor mounted on said shaft within said field poles comprising a single disc of magnetic material, a plurality of polar projections formed on the periphery of said disc, each of said polar projections comprising a part lying in the plane of the body of said disc and integral therewith and a lateral part separated from the body of said disc adjacent to the base of said polar projection and disposed at an angle of substantially 45 degrees to the plane of the body thereof and manual means for starting said rotor.

13. In a synchronous motor, a shaft, a rotor comprising a disc of magnetic material mounted on said shaft, said rotor having a plurality of polar units adjacent to the edge of said disc, each of said units having a part that remains in the plane of the body of the disc and a lateral part that is separated from the body of the disc, such that its outer edge lies adjacent to said periphery, the inner edge thereof a substantial distance therefrom, its forward edge along a substantially radial line, and angularly disposed to the plane of the body of said disc.

14. In a synchronous motor, a shaft, a rotor comprising a disc of magnetic material mounted on said shaft, said rotor having a plurality of polar units adjacent to the edge of said disc, each of said units having a part that remains in the plane of the body of the disc and a lateral part that is separated from the body of the disc, such that its outer edge lies adjacent to said periphery, the inner edge thereof a substantial distance therefrom, its forward edge along a substantially radial line, and disposed at an angle of substantially 45 degrees to the plane of the body of said disc.

ANDREW H. NEUREUTHER.